United States Patent [19]
Ryoke et al.

[11] Patent Number: 4,539,257
[45] Date of Patent: Sep. 3, 1985

[54] MAGNETIC RECORDING MEDIUM HAVING IMPROVED RUNNING PROPERTIES

[75] Inventors: Katsumi Ryoke; Kenichi Masuyama; Takashi Yoneyama; Norio Nasu; Eiichi Tadokoro, all of Kanagawa, Japan

[73] Assignee: Fuji Photo Film Co., Ltd., Kanagawa, Japan

[21] Appl. No.: 599,917

[22] Filed: Apr. 13, 1984

[30] Foreign Application Priority Data

Apr. 13, 1983 [JP] Japan ................................. 58-65046

[51] Int. Cl.$^3$ ................................................ G11B 5/70
[52] U.S. Cl. ..................................... 428/323; 360/134; 360/135; 360/136; 427/128; 427/131; 252/62.54; 428/336; 428/694; 428/695; 428/900
[58] Field of Search .............. 428/694, 695, 407, 403, 428/408, 900, 323, 336; 427/44, 130, 131, 128

[56] References Cited

U.S. PATENT DOCUMENTS

| | | | |
|---|---|---|---|
| 4,091,924 | 5/1978 | Newton | 428/694 |
| 4,132,827 | 1/1979 | Mukaida | 428/408 |
| 4,275,113 | 6/1981 | Saito | 427/131 |
| 4,337,288 | 6/1982 | Takenaka | 428/409 |
| 4,415,630 | 11/1983 | Kubota | 428/403 |
| 4,448,842 | 5/1984 | Yamaguchi | 428/695 |
| 4,497,864 | 2/1985 | Ryoke | 428/323 |

Primary Examiner—Ellis P. Robinson
Attorney, Agent, or Firm—Sughrue, Mion, Zinn, Macpeak & Seas

[57] ABSTRACT

A magnetic recording medium comprised of a nonmagnetic support base having a magnetic layer provided thereon is disclosed. The magnetic layer includes ferromagnetic particles dispersed in a binder in combination with carbon black particles. The carbon black particles have an average primary particle size in the range of 30 m$\mu$ to 50 m$\mu$. Further, the carbon black is capable of the adsorption of 120 ml or more of dibutyl phthalate per 100 g of carbon black. By utilizing the particular carbon black of the present invention it is possible to obtain a magnetic recording medium having improved running properties.

20 Claims, No Drawings

MAGNETIC RECORDING MEDIUM HAVING IMPROVED RUNNING PROPERTIES

FIELD OF THE INVENTION

The present invention relates to a magnetic recording medium and, more specifically, to a magnetic recording medium comprising a magnetic layer which has excellent surface characteristics, a low friction coefficient with respect to various materials which make up decks used for magnetic recording/reproduction and which contact with the magnetic layer. Further the medium has excellent lubricating characteristics.

BACKGROUND OF THE INVENTION

Hitherto, in magnetic recording media having insufficient lubricating characteristics, the surface of the magnetic layer becomes smooth due to frictional contact with parts composing the deck for magnetic recording/reproduction to increase the friction coefficient of the magnetic layer. Such magnetic recording media comprising the magnetic layer having a high friction coefficient cause a cohesion phenomenon on the running contact parts due to the presence of fine water drops under, particularly, high humidity (relative humidity of 60% or more). When the cohesion phenomenon occurs in the magnetic recording medium and the running contact parts composing the deck for magnetic recording/reproduction, stick-slip phenomenon occurs resulting in generation of audible running noise, if running tension is superior to cohesive force. Further, recorded signals in the magnetic recording medium causing the stick-slip phenomenon produce frequency modulation in the running direction and, consequently, it becomes difficult to carry out reproduction of recording in a normal state. Further, in the magnetic recording medium used for recording, when the stick-slip phenomenon occurs during reproduction, reproduction in a normal state cannot be carried out and wow, flutter and jitter phenomena occur. Inversely, when the cohesion phenomenon occurs in magnetic recording medium and the running contact parts composing the deck for magnetic recording/reproduction, running stops and, consequently, it becomes impossible to carry out recording and reproduction, if cohesive force is superior to running tension. In this field of art, this phenomenon is called "tape squeal". Such magnetic recording media and decks for magnetic recording/reproduction have a very inferior commerce value.

The squeals originate from the materials of the running system for the magnetic recording media, running tension and running rate, etc. in the deck for magnetic recording/reproduction. Further, such squeals can originate from the smoothing of the surface of the magnetic layer and increases in the surface friction coefficient, etc. of the magnetic recording media.

In order to improve the surface lubricating characteristics of the magnetic recording media, many solid lubricants and liquid lubricants are used. Examples of such lubricants include conventional finely-divided inorganic and organic powers ($Al_2O_3$, graphite, silica, $Cr_2O_3$, ZnO and carbon black, etc.), organic surface active agents and lubricants (higher hydrocarbon compounds, aliphatic alcohols, aliphatic acids, aliphatic acid esters, aliphatic acid amides, aliphatic acid salts and aliphatic acid quaternary salts, etc.), as described in U.S. Pat. Nos. 3,423,233 and 2,654,681, Japanese Patent Publication Nos. 12208/82, 26882/72, 18482/73, 14249/74 and 10688/81, Japanese Patent Application (OPI) Nos. 97403/79, 124127/81, 53402/74, 117739/80, 117738/80, 8804/77, 198539/82, 16105/72, 51027/81 and 24027/82 and British Pat. No. 2,080,319.

Carbon black has been frequently studied with respect to particle sizes for the purpose of improving the running property (for example, Japanese Patent Application (OPI) Nos. 62604/75 and 124123/81). It is known that when carbon black having a particle size of a certain value or more is blended, the face of the magnetic recording medium becomes coarse and the contact area of the magnetic recording medium during running decreases reducing the friction coefficient.

Although the running property can be improved to a certain degree by using such particles, it is still not sufficient.

SUMMARY OF THE INVENTION

Accordingly, the present inventors have carried out studies on the relation between the particle size of carbon black and running properties.

In general, when carbon black is blended with many binders or lubricants, the strength that the carbon black is given by the other materials or the strength that the carbon black bestows on the binders, etc. does not depend upon the particle size of the carbon black. It is believed that the hardness of primary or secondary particles of carbon black formed when blending with binders or lubricants, etc. or the hardness bestowed on the binders varies depending on factors such as the properties of the carbon black, the process for producing it and raw materials for it, etc. However, the present inventors have now found that carbon black which has a specified particle size and a specific amount of dibutyl phthalate absorption function so as to increase the strength and improve the running properties when blended with binders or lubricants.

A primary object of the present invention is to provide novel additives for the magnetic layer and to provide a magnetic recording medium having excellent running properties.

Namely, the present invention relates to a magnetic recording medium comprising a magnetic layer provided on a non-magnetic base, wherein said magnetic layer contains carbon black having an average primary particle size of 30 to 50 m$\mu$ and being capable of the adsorption of dibutyl phthalate in an amount of 120 ml or more based on 100 g of carbon black.

DETAILED DESCRIPTION OF THE INVENTION

Carbon black used in the present invention has an average primary particle size of 30 to 50 m$\mu$ and preferably 32 to 45 m$\mu$. Typical examples of such carbon black which is commercially available include the following.

| Kinds | | Average particle size | Amount of DBP adsorption | Specific surface area | Volatile* content | Maker |
|---|---|---|---|---|---|---|
| Seast 116 | MAF | 30 m$\mu$ | 133 ml/100 g | 54 m$^2$/g | 1.3% | Tokai Carbon Co. |

-continued

| | Kinds | Average particle size | Amount of DBP adsorption | Specific surface area | Volatile* content | Maker |
|---|---|---|---|---|---|---|
| Asahi #60 H | MAF | 35 mµ | 125 ml/100 g | 49 m$^2$/g | 1.0% | Asahi Carbon Co. |
| Diablack SF | SF (Corresponding to FEF and MAF | 40 mµ | 127 ml/100 g | 56 m$^2$/g | 1.0% | Mitsubishi Chemical Industries Co. |
| Diablack E | FEF | 43 mµ | 124 ml/100 g | 43 m$^2$/g | 0.4% | Mitsubishi Chemical Industries Co. |
| Diablack 550 M | MAF | 41 Mµ | 131 ml/100 g | 50 m$^2$/g | 0.6% | Mitsubishi Chemical Industries Co. |

*Volatile content is related to the amount of chemisorbed oxygen which is present on the carbon surface, and was measured according to JIS K-6221-1975.

Of these, Asahi #60H, Diablack SF, Diablack E and Diablack 550M are preferably used, and Asahi #60H is particularly preferably used in the present invention.

The carbon black used in the present invention is furnace carbon for rubber, which is called MAF (medium antifriction) and FEF (good extrusion) classified in the carbon black industry.

The average primary particle size of these kinds of carbon black is typically in the range of 30 to 50 mµ.

The amount of dibutyl phthalate (DBP) adsorption of carbon black used in the present invention is 120 ml or more, preferably 120 to 150 ml, more preferably 125 to 131 ml based on 100 g of carbon black. It is preferred that the specific surface area of carbon black used in the present invention measured by a nitrogen adsorption method is 35 m$^2$/g or more, more preferably 40 to 60 m$^2$/g, particularly preferably 43 to 56 m$^2$/g.

Carbon black in the present invention is used in an amount of 0.1 to 30 parts by weight, preferably 1 to 20 parts by weight, more preferably 2 to 10 parts by weight, based on 100 parts by weight of ferromagnetic particles.

Carbon black having an average primary particle size of 30 mµ to 50 mµ and an DBP adsorption of 120 ml/100 g of more used in the present invention provides a remarkable effect improving the running properties, and the carbon black is used as additives particularly suitable for audio type magnetic recording layers and metal type magnetic recording layers.

Ferromagnetic particles which can be used in the magnetic layer with the carbon black of the present invention include $\gamma$-Fe$_2$O$_3$, Fe$_3$O$_4$, $\gamma$-FeO$_x$ (1.33<x<1.50), CrO$_2$, Co—Ni—P alloy, Co—Ni—Fe—B alloy, Fe—Ni—Zn alloy, Ni—Co alloy, Co—Ni—Fe alloy, etc. Examples of them have been described in Japanese Patent Publication No. 26890/81 and U.S. Pat. No. 4,135,016.

These ferromagnetic particles have a particle size of about 0.1 to 1 µm in length, the ratio of length/width (acicular ratio) of which is in a range of 1/1 to 20/1. Further, these ferromagnetic particles generally have a specific surface area of about 1 m$^2$/g to 60 m$^2$/g, preferably 20 to 55 m$^2$/g and more preferably 30 to 50 m$^2$/g. The surface of ferromagnetic particles may be impregnated with dispersing agents, lubricants and antistatic agents for various purposes so as to be adsorbsed therein.

Useful binders for the present invention include known thermoplastic resins, thermosetting resins or reaction type resins and mixtures of them.

Useful thermoplastic resins include those having a softening point of 150° C. or less, an average molecular weight of 10,000 to 200,000 and a degree of polymerization of about 200 to 500. Examples of thermoplastic resins include vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, nylon-silicone resins, nitrocellulose-polyamide resins, polyvinyl fluoride, vinylidene chloride-acrylonitrile copolymers, butadieneacrylonitrile copolymers, polyamide resins, polyvinyl butyral, cellulose derivatives (cellulose acetate butyrate, cellulose diacetate, cellulose triacetate, cellulose propionate, nitrocellulose, etc.), styrene-butadiene copolymers, polyester resins, chlorovinyl ether-acrylic acid ester copolymers, amino resins, various kinds of synthetic rubbers and mixtures of them.

Further, as monomers for vinyl type thermoplastic resins, it is preferred to use vinyl chloride, vinyl acetate, methyl acrylate, acrylonitrile, methyl methacrylate, ethylene, propylene, vinyl alcohol, acrylic acid, ethylene oxide, propylene oxide, maleic acid, fumatic acid, vinylidene chloride, vinylidene bromide, isobutylene, styrene, vinyl alkoxy ether and vinylidene cyanide. Resins having an average molecular weight of 10,000 to 200,000 which have at least two of the above described monomers as repeating units are preferably used.

Useful thermosetting resins or reaction type resins include those which have a molecular weight of 200,000 or less before coating and upon being heated after coating and drying, the molecular weight becomes infinite through condensation reactions, addition reactions or the like. Further among these resins, those which do not soften or fuse before thermal decomposition are preferred. Examples of the resins include phenol resins, epoxy resins, polyurethane setting type resins, urea resins, melamine resins, alkyd resins, silicone resins, acryl reactive resins, epoxy-polyamide resins, nitrocellulose-melamine resins, mixtures of high molecular weight polyester resin and isocyanate prepolymer, mixtures of methacrylic acid salt copolymer and diisocyanate prepolymer, mixtures of polyester polyol and polyisocyanate, urea-formaldehyde resins, mixtures of low molecular weight glycol/high molecular weight diol/triphenylmethane triisocyanate, polyamine resins and mixtures thereof. Examples of these resins have been described in Japanese Patent Publication No. 26890/81 and U.S. Pat. No. 4,135,016.

The running characteristic are most improved by combining the carbon black of the present invention with one of the following resins: nitrocellulose, polyurethane, vinyl chloride-vinyl acetate-vinyl alcohol copolymers, vinyl chloride-vinyl acetate-maleic acid copolymers, vinyl chloride-vinyl acetate-maleic acid-vinyl alcohol copolymers and epoxy resins. These binders have preferably a molecular weight of 10,000 to 100,000 and a glass transition temperature of not less than 40° C.

These binders may be used alone or in various combinations.

The amount of the binder used in the present invention is in the range of 10 to 200 parts by weight, preferably 30 to 150 parts by weight, based on 100 parts by weight of ferromagnetic particles.

Useful additives include dispersing agents, lubricants, abrasives, antistatic agents and light-shielding agents.

Useful lubricants include silicone oils, graphite, fluorinated alcohols, polyolefins, molybdenum disulfide, tungsten disulfide, aliphatic acid esters composed of monobasic aliphatic acid having 12 to 16 carbon atoms and one or more of monohydric alcohol having 3 to 12 carbon atoms, dihydric alcohol, trihydric alcohol, tetrahydric alcohol and hexahydric alcohol, and aliphatic acid esters composed of monobasic alphatic acids having 17 or more carbon atoms and monohydric-hexahydric alcohol having a total of 21 to 23 carbon atoms when added to the carbon atoms in the aliphatic acid. These lubricants are added in a range of 0.2 to 20 parts by weight based on 100 parts by weight of the binder. They have been described in Japanese Patent Publication No. 26890/81 and U.S. Pat. No. 4,135,016. Of these, dimethyl polysiloxane, butyl stearate, butyl palmitate and isooctyl stearate contribute particularly well to the running characteristics when combined with the carbon black of the present invention.

Useful dispersing agents include aliphatic acids having 12 to 18 carbon atoms ($R_1COOH$, wherein $R_1$ represents an alkyl group having 11 to 17 carbon atoms) such as caprilic acid, capric acid, lauric acid, myristic acid, palmitic acid, stearic acid, oleic acid, elaidic acid, linolic acid, linolenic acid, stearolic acid, etc. Metal soaps composed of alkali metal (Li, Na, K, etc.) salts or alkaline earth metal (Mg, Ca, Ba, etc.) salts of the above described aliphatic acids, and lecithin, etc. may also be used. In addition, it is possible to use higher alcohols having 12 or more carbon atoms and sulfuric acid esters thereof. Of these, stearic acid is particularly preferred to use as a combination with the carbon black of the present invention. These dispersing agents are added in a range of 1 to 20 parts by weight based on 100 parts by weight of the binder.

Useful abrasives include those materials conventionally used, such as fused alumina, silicon carbide, chromium oxide, corundum, artificial corundum, diamond, artificial diamond, garnet, emery (main components: corundum and magnetite), etc. Of these abrasives, those having an average particle size of 0.05 to 5 μm, preferably 0.1 to 2 μm, are preferably used. These abrasives are added in a range of 0.5 to 20 parts by weight based on 100 parts by weight of the binder. They have been described in Japanese Patent Publication No. 26890/81 and U.S. Pat. No. 4,135,016. Of these, alumina ($Al_2O_3$) and chromium oxide ($Cr_2O_3$) contribute particularly well to improving the running characteristics when combined with carbon black of the present invention.

Formation of the magnetic recording layer is carried out by dissolving the above described composition in a suitable solvent and applying the resulting coating solution to a base.

The thickness of the magnetic layer is generally from 1 to 20 μm, and preferably from 1.5 to 10 μm.

When preparing a tape, the base preferably has a thickness of 2.5 to 100 μm, preferably 3 to 50 μm. When preparing a disk or a card, it has a thickness of 0.5 to 10 mm. When preparing a drum, a cylinderic base can be used. The materials used for the base include not only plastics such as polyesters such as polyethylene terephthalate, polyethylene naphthalate, etc., polyolefins such as polypropylene, etc., cellulose derivatives such as cellulose triacetate, cellulose diacetate, etc., vinyl resins such as polyvinyl chloride, etc., and polycarbonates, but also metals such as aluminium, copper, etc. and ceramics such as glass, etc.

The base may have a so-called back coating layer on the opposite side thereof with respect to the side providing with the magnetic layer.

The back coating layer may be comprised of a resin selected from the above described resins used for the magnetic recording media as a binder and a non-magnetic powder. Useful non-magnetic powder include those having an average particle size of 10 μm to 5 μm. Examples include carbon black, graft carbon black, graphite, titanium oxide, silica, non-magnetic $Fe_2O_3$, aluminium oxide, chromium oxide, molybdenum disulfide, calcium carbonate, sodium silicate, magnesium silicate, zinc oxide, silicon nitride, etc.

Further, the back coating layer may contain an antistatic agent, light-shielding agents, lubricants and dispersing agents depending on the intended use. Examples of these compounds include the same compounds described above.

The time of adding the carbon black during the production process can be suitably selected. It may be added any time before or after previous dispersing, after the main dispersion, before or after previous kneading, and after the main kneading.

Further, addition of the ferromagnetic particles in the production process should be carried out before the main kneading and/or main dispersing. Accordingly, it is possible to attach (adsorb) one or more of the above described lubricants, thermoplastic resins, dispersing agents, anitstatic agents and light-shielding agents to the carbon black and/or the ferromagnetic particles dispersed in an organic solvent in the process prior to the main dispersing or main kneading.

Further, the magnetic recording medium of the present invention can be prepared using materials described in Japanese Patent Publication No. 26890/81 and U.S. Pat. No. 4,135,016.

In the following, the present invention is illustrated in greater detail by examples. In Examples, "part" means "parts by weight". However, the scope of the invention is not limited to the examples.

EXAMPLE 1

After the following composition was sufficiently kneaded in a ball mill, 20 parts of "Desmodur L-75" (trade name of polyisocyanate compound produced by Bayer Co.) was added and uniformly dispersed by blending to obtain a magnetic coating.

| | |
|---|---|
| $\gamma$-$Fe_2O_3$ | 300 parts |
| Nitrocellulose | 30 parts |
| Polyurethane (molecular weight: about 30,000) | 20 parts |
| Vinyl chloride-vinyl acetate-vinyl alcohol copolymer | 10 parts |
| "Asahi carbon #60 H" (average particle size: 35 mμ) | 25 parts |
| Cyclohexanone | 300 parts |

Methyl ethyl ketone                      300 parts

After viscosity of this magnetic coating was controlled, it was applied to the surface of a polyester base followed by carrying out orientation and drying to produce a magnetic tape. Thereafter, it was subjected to mirror face processing and cut into ½ inch widths to produce a sample.

COMPARATIVE EXAMPLE 1

A magnetic coating was prepared using the same composition as in Example 1, except that the carbon black was replaced with 25 parts of "Colombian Carbon Neo-spectra" (average particle size: 11 m$\mu$, amount of DBP adsorption: 210 ml/100 g, specific surface area: 1000 m$^2$/g, volatile content: 13.8%), and a tape was produced by the same procedure as in Example 1.

COMPARATIVE EXAMPLE 2

A magnetic coating was prepared using the same composition as in Example 1, except that the carbon black was replaced with 25 parts of "Asahi Carbon #70" (average particle size: 27 m$\mu$, amount of DBP adsorption: 102 ml/100 g, specific surface area: 82$^2$ m/g), and a tape was produced by the same procedure as in Example 1.

COMPARATIVE EXAMPLE 3

A magnetic coating was prepared using the same composition as in Example 1, except that the carbon black was replaced with 25 parts of "Asahi #50" (average particle size: 94 m$\mu$, amount of DBP adsorption: 62 ml/100 g, specific surface area: 21 m$^2$/g), and a tape was produced by the same procedure as in Example 1.

COMPARATIVE EXAMPLE 4

A magnetic coating was prepared using the same composition as in Example 1, except that the carbon black was replaced with 25 parts of "Colombian Raven MTP" (average particle size: 280 m$\mu$, amount of DBP adsorption: 36 ml/100 g, specific surface area: 8 m$^2$/g), and a tape was produced by the same procedure as in Example 1.

COMPARATIVE EXAMPLE 5

A magnetic coating was prepared using the same composition as in Example 1, except that the carbon black was not used, and a tape was produced by the same procedure as in Example 1.

The results of measuring the characteristics of the tapes produced in Example 1 and Comparative Examples 1 to 5 are shown in Table 1.

TABLE 1

| Test Sample | Characteristic of Carbon | | | | Number of Runs |
|---|---|---|---|---|---|
| | Average Particle Size | Amount of Oil Adsorption | Specific Surface Area | Volatile Content | |
| Example 1 | 35 m$\mu$ | 125 ml/100 g | 49 m$^2$/g | 1.0% | 39 |
| Comparative Example 1 | 11 m$\mu$ | 210 ml/100 g | 1000 m$^2$/g | 13.8% | 6 |
| Comparative Example 2 | 27 m$\mu$ | 102 ml/100 g | 80 m$^2$/g | 1.2% | 7 |
| Comparative Example 3 | 94 m$\mu$ | 62 ml/100 g | 21 m$^2$/g | 0.8% | 3 |
| Comparative Example 4 | 280 m$\mu$ | 36 ml/100 g | 8 m$^2$/g | 1.0% | 3 |
| Comparative Example 5 | — | — | — | — | 0 |

The methods of measuring the characteristics shown in Table 1 and the criterion for judging thereof are described below. The number of runs at which tape squeal occurred when the runs were repeated under a condition of 20° C. and 85% RH was measured. The criterion for judging is the number at which each sample generates audible sound with the running system of the tape deck.

The examples of the present invention show that the carbon black used in the present invention has remarkable effects, particularly with respect to improving the number of runs which can be made before tape squeal occurs, as compared with tapes having carbon black with other particle sizes.

EXAMPLE 2

After the following composition was sufficiently kneaded in a ball mill in turn, 20 parts of "Desmodur L-75" (trade name of polyisocyanate compound produced by Bayer Co.) was added and uniformly dispersed by blending to produce a magnetic coating.

| | |
|---|---|
| $\gamma$-Fe$_2$O$_3$ | 300 parts |
| Vinyl chloride-vinyl acetate-vinyl alcohol copolymer | 30 parts |
| Epoxy resin (epoxy group content: 0.56) | 30 parts |
| "Diablack E" (average particle size: 43 m$\mu$) | Amount shown in Table 2 |
| Dimethyl polysiloxane (viscosity at 25° C.: 1000 cs) | 6 parts |
| Butyl palmitate | 5 parts |
| Abrasive (Al$_2$O$_3$) | 20 parts |
| Cyclohexanone | 300 parts |
| Methyl ethyl ketone | 250 parts |

The amount of carbon black added was 20 parts, 16 parts, 10 parts, 4 parts or 0 part. After the viscosity of these magnetic coatings was adjusted, they were each applied to a surface of a polyester base film, followed by carrying out orientation and drying to produce magnetic tapes. They were cut into ½ inch widths in the same manner as Example 1 to produce samples, which were shown as sample numbers, 1, 2, 3, 4 and 5.

COMPARATIVE EXAMPLE 6

Tapes were produced using the same composition as in Example 2, except that the carbon black was replaced with "Asahi carbon #50". The amount of carbon black added was 20 parts, 16 parts, 10 parts or 4 parts. Each tape was shown as sample number 6, 7, 8 or 9.

The results of measuring the characteristics of the tapes produced in Example 2 and Comparative Example 6 are shown in Table 2.

TABLE 2

| Sample Number | Carbon | Amount Added | Number of Runs |
|---|---|---|---|
| 1 | Diablack E | 20 parts | more than 100 |
| 2 | " | 16 parts | 62 |
| 3 | " | 10 parts | 25 |
| 4 | " | 4 parts | 17 |
| 5 | " | 0 part | 12 |
| 6 | Asahi carbon #50 | 20 parts | 17 |
| 7 | " | 16 parts | 15 |
| 8 | " | 10 parts | 13 |
| 9 | " | 4 parts | 13 |

The number of runs were measured under a condition of 20° C. and 75% RH by the same method as in Example 1 shown in Table 1.

Table 2 clearly shows that the carbon black of the present invention has a remarkable effect with respect to improving the running properties when using organic lubricants. Further, with respect to the running properties and the amount of carbon black added, it can be seen that the improvement is similar to the case of using conventional carbon black when about 1 part by weight of carbon black is used based on 100 parts by weight of finely-divided ferromagnetic particles.

EXAMPLE 3

After the following composition was sufficiently kneaded in a ball mill, 20 parts of "Desmodur L-75" (trade name of polyisocyanate compound produced by Bayer Co.) was added and uniformly dispersed by blending to produce a magnetic coating.

| | |
|---|---|
| Co—No—Fe alloy powder (specific surface area: 50 m²/g) | 300 parts |
| Nitrocellulose | 50 parts |
| Polyurethane (molecular weight: about 30,000) | 20 parts |
| Benzoimidazole | 1 part |
| Abrasive (Cr₂O₃) | 20 parts |
| "Asahi carbon #60 H" | 30 parts |
| Isooctyl stearate | 10 parts |
| Stearic acid | 10 parts |
| Methyl ethyl ketone | 300 parts |
| Toluene | 300 parts |

After the viscosity of this magnetic coating was controlled, it was applied to the surface of a polyester base and dried to produce a magnetic tape.

After mirror face processing was carried out by the same manner as in Example 1, it was cut into ½ inch widths.

COMPARATIVE EXAMPLE 7

A tape was produced by the same procedure using the same composition was in Example 3, except that the carbon black was replaced with 30 parts of "Asahi carbon #60" (average particle size: 50 mµ, amount of DBP adsorption: 115 ml/100 g specific surface area: 40 m²/g). Results of test in Example 3 and Comparative Example 7 are shown in Table 3.

TABLE 3

| | Characteristics of Carbon | | | |
|---|---|---|---|---|
| | Average particle size | Amount of DBP adsorption | Specific surface area | Number of runs |
| Example 3 | 35 mµ | 125 ml/100 g | 49 m²/g | more than 60 |
| Comparative Example 7 | 50 mµ | 115 ml/100 g | 40 m²/g | 12 |

The number of runs were measured under a condition of 20° C. and 87% RH by the same method as in Example 1.

Table 3 shows that when using carbon black having an average particle size of 30 to 50 mµ, the number of runs varies greatly depending on the amount of DBP adsorption. Particularly, carbon black having an amount of DBP adsorption of more than 120 ml/100 g shows excellent running characteristics.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
   a non-magnetic support base having provided thereon;
   a magnetic layer comprised of ferromagnetic particles dispersed in a binder along with carbon black particles having an average primary particle size in the range 30 mµ to 50 mµ, the carbon black being capable of the adsorption of 120 ml or more of dibutyl phthalate per 100 g of carbon black.

2. A magnetic recording medium as claimed in claim 1, wherein the carbon black is capable of the adsorption of 120 to 150 ml per 100 g of carbon black.

3. A magnetic recording medium as claimed in claim 1, wherein the carbon black has a specific surface area of 35 m²/g or more.

4. A magnetic recording medium as claimed in claim 3, wherein the carbon black has a specific surface area of 40 to 60 m²/g.

5. A magnetic recording medium as claimed in claim 1, wherein the ferromagnetic particles are selected from the group consisting of γ-Fe₂O₃, Fe₃O₄, γ-FeOx (1.33<x<1.50), CrO₂, Co—Ni—P alloy, Co—Ni—Fe—B alloy, Fe—Ni—Zn alloy, Ni—Co alloy and Co—Ni—Fe alloy.

6. A magnetic recording medium as claimed in claim 1, wherein the carbon black is present in an amunt of 0.1 to 30 parts by weight per 100 parts by weight of the ferromagnetic particles.

7. A magnetic recording medium as claimed in claim 1, wherein the binder is selected from the group consisting of nitrocellulose, polyurethane, vinyl chloride-vinyl acetate-vinyl alcohol copolymers, vinyl chloride-vinyl acetate-maleic acid copolymers, vinyl chloride-vinyl acetate-maleic acid-vinyl alcohol copolymers and epoxy resins.

8. A magnetic recording medium as claimed in claim 7, wherein the binder is present in an amount of 10 to 200 parts by weight per 100 parts by weight of the ferromagnetic particles.

9. A magnetic recording medium as claimed in claim 1, further comprising a lubricant present in an amount in the range of 0.2 to 20 parts by weight per 100 parts by weight of the binder.

10. A magnetic recording medium as claimed in claim 9, wherein the lubricant is selected from the group consisting of dimethyl polysiloxane, butyl stearate, butyl palmitate and isooctyl stearate.

11. A magnetic recording medium as claimed in claim 9, further comprising a dispersing agent in an amount in the range of 1 to 20 parts by weight per 100 parts by weight of the binder.

12. A magnetic recording medium as claimed in claim 11, further comprising an abrasive having an average particle size in the range of 0.05 to 5 μm in an amount in the range of 0.5 to 20 parts by weight per 100 parts by weight of the binder.

13. A magnetic recording medium as claimed in claim 1, wherein the magnetic layer has a thickness in the range of 1 to 20 μm.

14. A magnetic recording medium as claimed in claim 1, wherein said binder is a resin binder.

15. A magnetic recording medium as claimed in claim 14, wherein the average primary particle size of said carbon black is 30 to 45 mμ.

16. A magnetic recording medium as claimed in claim 15, wherein the amount of dibutyl phthalate adsorption of said carbon black is 125 to 131 ml based on 100 g of carbon black.

17. A magnetic recording medium as claimed in claim 16, wherein said carbon black has a specific surface area of 43 to 56 $m^2/g$.

18. A magnetic recording medium as claimed in claim 17, wherein the amount of carbon black is 1 to 20 parts by weight based on 100 parts by weight of ferromagnetic particles.

19. A magnetic recording medium as claimed in claim 18, wherein the amount of carbon black is 2 to 10 parts by weight based on 100 parts by weight of ferromagnetic particles.

20. A magnetic recording medium as claimed in claim 19, wherein from 30 to 150 parts by weight of resin binder is used based on 100 parts by weight of ferromagnetic particles.

* * * * *